United States Patent
Bendakovsky et al.

(10) Patent No.: US 8,626,717 B2
(45) Date of Patent: *Jan. 7, 2014

(54) DATABASE BACKUP AND RESTORE WITH INTEGRATED INDEX REORGANIZATION

(75) Inventors: Amit Bendakovsky, Neu-Isenburg (DE); Namik Hrle, Boeblingen (DE); Thomas Ritter, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,381

(22) Filed: May 7, 2012

(65) Prior Publication Data

US 2012/0221523 A1    Aug. 30, 2012

Related U.S. Application Data

(63) Continuation of application No. 12/789,274, filed on May 27, 2010, now Pat. No. 8,200,633.

(30) Foreign Application Priority Data

Aug. 7, 2009    (DE) ................................ 09167456.4

(51) Int. Cl.
*G06F 17/30*    (2006.01)
(52) U.S. Cl.
USPC ........................... 707/660; 707/661; 707/752
(58) Field of Classification Search
None
See application file for complete search history.

(56) References Cited

U.S. PATENT DOCUMENTS

| | | | |
|---|---|---|---|
| 5,204,958 A | 4/1993 | Cheng et al. | |
| 5,222,235 A | 6/1993 | Hintz et al. | |
| 5,408,654 A | 4/1995 | Barry | |
| 5,517,641 A | 5/1996 | Barry et al. | |
| 5,758,357 A | 5/1998 | Barry et al. | |
| 5,887,274 A | 3/1999 | Barry et al. | |
| 6,381,605 B1 | 4/2002 | Kothuri et al. | |
| 6,591,269 B1* | 7/2003 | Ponnekanti | 707/1 |
| 6,694,323 B2 | 2/2004 | Bumbulis | |
| 7,372,857 B1 | 5/2008 | Kappler et al. | |
| 7,599,949 B1 | 10/2009 | Plasek et al. | |
| 7,966,298 B2 | 6/2011 | Bruso et al. | |
| 2003/0204513 A1 | 10/2003 | Bumbulis | |
| 2008/0235298 A1 | 9/2008 | Lin et al. | |
| 2009/0276430 A1* | 11/2009 | Bruso et al. | 707/8 |
| 2011/0035359 A1 | 2/2011 | Bendakovsky et al. | |

OTHER PUBLICATIONS

U.S. Appl. No. 12/789,274.

(Continued)

*Primary Examiner* — Son T Hoang
(74) *Attorney, Agent, or Firm* — Francis Lammes; Stephen J. Walder, Jr.; John D. Flynn

(57) ABSTRACT

A mechanism is provided for reorganizing a source index tree of a database table resulting in a target index tree of the database table is provided. A backup process reads source leaf pages of the source index tree in a logical order defined by a sequence of index keys. The logical order can be different from a physical order of the source leaf pages defined by a sequence of respective storage locations. The backup process constructs target leaf pages of the target index tree maintaining the logical order. A restore process constructs target non-leaf pages of the target index tree based on the distribution of the index keys among the constructed leaf pages and stores the target leaf and non-leaf pages.

17 Claims, 13 Drawing Sheets

(56) References Cited

OTHER PUBLICATIONS

"B+ tree", http://en.wikipedia.org/wiki/B%2B_tree, printed May 27, 2010, 4 pages.

"R-tree", http://en.wikipedia.org/wiki/R-tree, printed May 27, 2010, 3 pages.

* cited by examiner

| No. Index Rec. | Time (1 μsec per step) | | | |
| --- | --- | --- | --- | --- |
| | Prior art | | Preferred embodiment | |
| | Backup | Restore + Reorg | Backup | Restore |
| $10^4$ | 0,01 sec | 0,05 sec | 0,01 sec | 0,01 sec |
| $10^6$ | 1 sec | 7 sec | 1 sec | 1 sec |
| $10^9$ | 17 min | 2,8 hours | 17 min | 17 min |
| $10^{12}$ | 12 days | 5 months | 12 days | 12 days |

Fig. 4

DATABASE BACKUP AND RESTORE WITH INTEGRATED INDEX REORGANIZATION

BACKGROUND

The present invention relates to a method for reorganizing a source index tree of a database table resulting in a target index tree.

A database index is a data structure used in database systems. One of many purposes of a database index is an acceleration of operations on a database table. The database index is a sorted list of the contents of one or more table columns of the database table, where each element of the list is associated with a pointer to a respective table row of the database table. While a database index saves time in the reading of data matching some criterion, it costs additional time to update the database index when table data are inserted, modified, or deleted.

Database indices can be stored in various forms of data structures. The most common data structure for a database index is a B+ tree. This index tree keeps data sorted in a way that allows searches, insertions, and deletions of index tree records at a short time. The B+ tree stores index records, each of which is identified by an index key (K) and a reference to one of the table rows of the database table. The index key is constructed from the contents of the one or more table columns the database index is referring to. Each of the table rows is identified by a respective row identifier (RID) or pointer (P).

In many database systems, database indices can be stored at storage locations, which are, for example, called indexspaces, that are separate from storage locations for database tables, which are, for example, called tablespaces.

The tree structure of the B+ tree comprises internal nodes, which are non-leaf nodes of the tree structure, and external nodes, which are leaf nodes of the tree structure. In contrast to the non-leaf nodes, the leaf nodes do not have any child nodes. The non-leaf nodes are parent nodes of the leaf nodes.

The internal nodes of the B+ tree have a variable number of child nodes within a pre-defined child number range, that is, from a minimum child number to a maximum child number. The order b of the B+ tree measures the capacity of child nodes for each parent node, that is, defines the maximum possible number of child nodes. The minimum number of child nodes is typically defined to be half of the order b, that is, b/2, rounded up to the nearest integer.

The external nodes of the B+ tree store sets of the index records, where the sets have pre-defined record number ranges, that is, from a minimum record number to a maximum record number. The internal nodes of the B+ tree, however, do not store index records. The index records have a logical sort order that is defined by a sequence of the identifying index keys. The logical sequence of index records also defines a logical order of the leaf pages of the index tree.

All the internal and external nodes of the B+ tree have respective parent nodes except for the root node, which is at the top level of the index tree.

The internal nodes store respective ordered sets of pointer-key-pairs $(p_i, k_i)$. The pointer $p_i$ refers to a subtree of a child node, which has index records with key values that are less or equal than the key $k_i$ and greater than the key $k_{i-1}$ of a preceding pointer-key-pair $(p_{i-1}, k_{i-1})$.

The number of nodes along an index tree branch descending from the root node to a leaf node defines a height h of the index tree. A B+ tree is kept balanced by requiring that all leaf nodes have the same index tree height h.

If a storage system has a block or page size of B bytes, and each of the pointer-key-pairs to be stored in the non-leaf nodes has a size of k, the most efficient B+ tree has a maximum child number of b<(B/k) for the non-leaf nodes. In this case, the physical storage size of one of the non-leaf nodes does not exceed the block or page size of the storage system. In the same way, a maximum number of index records can be calculated for the leaf nodes that is most efficient for a given block or page size. In the remainder of the description, the term "page" is used to describe a segment of storage space that holds information represented by one node of the index tree. The sequence of physical storage locations for respective leaf pages defines a physical order of the leaf pages.

When a table row is added or removed from a database table that is associated with a database index, a corresponding index record must be respectively added or removed from the database index. In the case of the B+ tree, all insertions and deletions of index records happen in the leaf nodes.

When a specific index record is to be inserted into a specific leaf page and the number of index records of the specific leaf page exceeds the pre-defined maximum record number, the specific leaf page can be subject to a split operation. In this case, a database management component of a database management system (DBMS) determines an unused storage location for a leaf page based on a space map page and allocates the free storage location to a new leaf page. In the database storage, the allocated storage location should be as close to the storage location of the specific leaf page as possible. Typically, half of the index tree records of the specific leaf page are moved to the new leaf page. A new pointer is added to the parent non-leaf page of the specific leaf page, where the new pointer refers so the new leaf page.

When an index record is deleted from a specific leaf page and the number of index records of the specific leaf page falls below a pre-defined minimum record number, the specific leaf page can be subject to a join operation. A join operation joins index records of two leaf pages that are adjacent in the logical sequence of leaf pages. The two leaf pages do not need no have adjacent physical storage locations. The join operation of the two leaf pages is only possible if their total number of index records fails below the maximum record number. After the join operation, one of the pointers referring to the two leaf pages is deleted from the respective parent non-leaf page and one or more key values of one or more parent non-leaf pages are adapted no key values of the joined leaf page.

The insertion and deletion of child pointers from the non-leaf pages can cause split and join operations of the non-leaf pages in the same way as described for index records of the leaf pages. The root node of the index tree, however, plays a special role: When more child nodes are to be added to the root node than a pre-defined maximum child number, the root node is split into two non-leaf nodes and a new root node is created for the index tree, where the two split non-leaf nodes become child nodes of the new root node. In this case, the height of the index tree is increased by one. When child nodes are removed from the root node and the root node only has one child node left, the root node is deleted and the child node becomes a new root node of the index tree. In this case, the height of the index tree is decreased by one.

B+ trees can waste some storage space since leaf and non-leaf nodes are not always entirely full, that is, respectively have less than the pre-defined maximum number of records and child nodes.

Join and split operations can cause a fragmentation of the leaf pages. Due to the split operations, the logical order of the leaf pages will become different from the physical order of the leaf pages. The join operations will leave unused storage locations after deleting leaf pages. The fragmentation of the leaf pages can significantly reduce the performance of the database index. When a database index has been perfectly reorganized and only a few split and join operations have fragmented the database index, subsequent leaf pages in the logical order are mostly neighbours in physical storage or at least not too far away from one another. To keep a database index defragmented as far as possible, the database management component tries to avoid split and join operations.

The database management component accesses leaf pages of the index tree by reading chunks of leaf pages and writing them to a cache. The leaf pages of one chunk are subsequent in the physical order, but not necessarily subsequent in the logical order. The more the leaf pages are fragmented, the more chunks of leaf pages must be read by the database management component to get a logical sequence of leaf pages. Thus, the increasing fragmentation of the leaf pages reduces the performance of the database system.

To improve the performance of the database system, a so-called reorganization can eliminate a difference between the physical order and the logical order of the leaf pages of the database index. Prior art database systems are simply rebuilding the index tree based on current information found in one or more columns of the database table. The database management component scans the database table in a physical order of the table rows. This is also called a full table scan. For each of the table rows, a respective index record is created. If the total set of created index records is small, the index records can be sorted in the memory of the database system. If the total set of index records is too large to perform the sort operation in the memory, smaller subsets of index records can be separated and sorted in the memory. The sorted subsets can be temporarily stored in permanent storage and merged into a sorted total set of index records in the memory. The reorganization is called online, when the new database index is rebuilt in a shadow object, while concurrent transactions are accessing the old database index. Once the rebuild of the new database index has been completed, the database management component will re-read database logs to update the new database index incrementally. The updated new database index will replace the original version. Storage space used by the original database index will be released after the online reorganization.

The leaf pages of the B+ tree are linked to one another in a linked list according to the logical order of the leaf pages. Each of the leaf pages has a pointer to a preceding leaf page and a pointer to a succeeding leaf page of the linked list of leaf nodes. The first and last leaf page of the linked list only have one pointer to the respective adjacent leaf page. These pointers make range queries simpler and more efficient. The links to adjacent leaf pages allow quickly traversing the list of leaf pages in the logical order without reading pointer information from the parent non-leaf pages.

A database backup and restore creates a backup image, in the literature also named as backup copy, of a source database system, which is used to rebuild a target database system. The backup and restore of a database system may be also denoted as a database copy. The backup image of one database system can be represented by one or more files or datasets. Database tables and indices may be subdivided to different files or datasets. Reasons for a database backup and restore are data protection against loss and a setup of a system environment with multiple almost identical database systems that may be used as development, quality assurance and production systems. A different, for example, more powerful, hardware can also account for a database backup and restore.

Operating system components are used for transferring the backup image from the source to the target database system. In prior art, a reorganization of the database indices is performed after the restore of the target database system because the physical order of the database indices is maintained. As described above, a reorganization involves a rebuild of the database index trees, which can take a long time.

BRIEF SUMMARY

In one illustrative embodiment, a method, in a data processing system, is provided for reorganizing a source index tree of a database table resulting in a target index tree of the database table. The illustrative embodiment performs a backup of the source index tree from respective source storage locations. In the illustrative embodiment, the source index tree comprises source leaf pages and source non-leaf pages. In the illustrative embodiment, the source leaf pages comprise index records specifying respective index keys and respective table row identifiers of the database table, a source logical order defined by a sequence of the respective index keys of the index records, and a source physical order defined by a sequence of the respective source storage locations. In the illustrative embodiment, the source physical order of the source leaf pages being possibly different from the source logical order of the source leaf pages. In performing the backup of the source index tree from the source storage locations the illustrative embodiment: determines a sequence of the source storage locations according to the source logical order of the source leaf pages, reads the source leaf pages from the source storage locations according to the determined sequence of the source storage locations, and constructs target leaf pages of the target index tree, the target leaf pages having copies of the index records and a target logical order defined by the sequence of the index keys of the copies of the index records. The illustrative embodiment then performs a restore of the target index tree at target storage locations. In performing the restore of the target index tree at target storage locations the illustrative embodiment: writes the constructed target leaf pages to the respective target storage locations defining a target physical order of the target leaf pages, the target physical order corresponding to the target logical order of the target leaf pages, constructs target non-leaf pages of the target index tree based on the distribution of the index keys among the constructed leaf pages, and writes the constructed target non-leaf pages to the respective target storage locations.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other objects, features, and advantages of the present invention are apparent from the following detailed description taken in conjunction with the accompanying drawings, in which:

FIG. 4 illustrates a table of duration samples for database backup and restore according to an embodiment of the present invention.

DETAILED DESCRIPTION

Figure 1A:
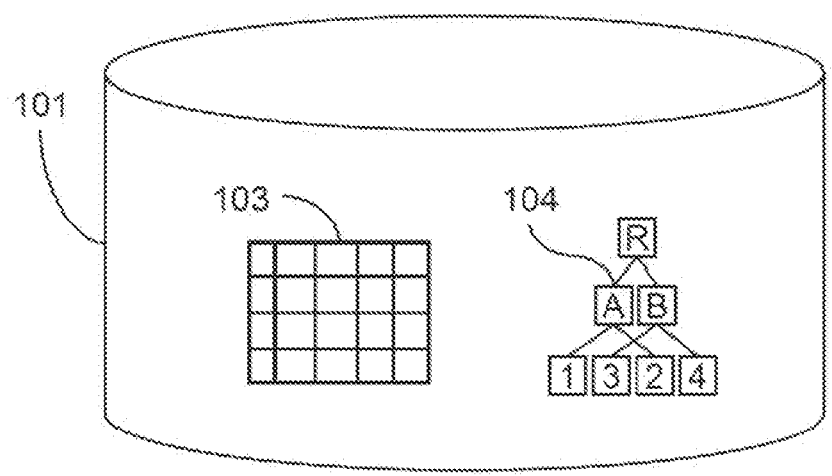
FIG. 1a illustrates a block diagram of an offline database copy according to an embodiment of the present invention.
Figure 1A:
Figure 1A:
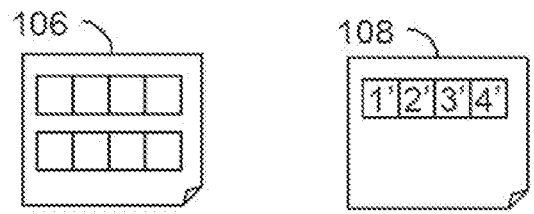
Figure 1A:
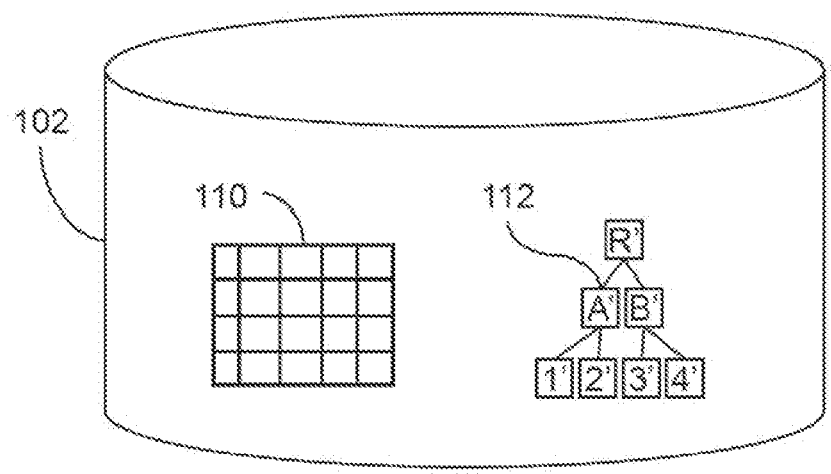

FIG. 1a illustrates a block diagram of an offline database backup and restore with integrated index tree reorganization. A source database system (101) comprises database tables (103) and database indices (104), where each database index is associated with a respective database table. The database index has a structure of a B+ index tree. The database index has leaf pages (104: 1, 3, 2, 4) and non-leaf pages (104: R, A, B), where the top-level non-leaf page is called root page (104: R). The leaf pages have a logical order, that is, 1, 2, 3, and 4, according to a sequence of index keys in the leaf pages. The leaf pages also have a physical order, that is, 1, 3, 2, 4, according to a sequence of physical storage locations at which she leaf pages are stored. An offline database backup (105) creates a table backup image (106) from the database tables as known in the prior art. The backup (107) of database indices to an index backup image is different from prior art in that only constructed leaf pages (108: 1', 2', 3', 4') are stored in the index backup image (108) in a logical order (1', 2', 3', 4') according to the sequence of index keys. The non-leaf pages of the source index tree, however, are not written to the index backup image. The database tables (110) of the target database system (102) are restored (109) based on the table backup image (106) as known in prior art. The restore (111) of the database indices (112) of the target database system from the index backup image (108) is different from prior art in that only the constructed leaf pages (112: 1', 2', 3', 4') are restored and the non-leaf pages (112: A', B', R') are re-built in the target database system, preferably while restoring the leaf pages.

Figure 1B:
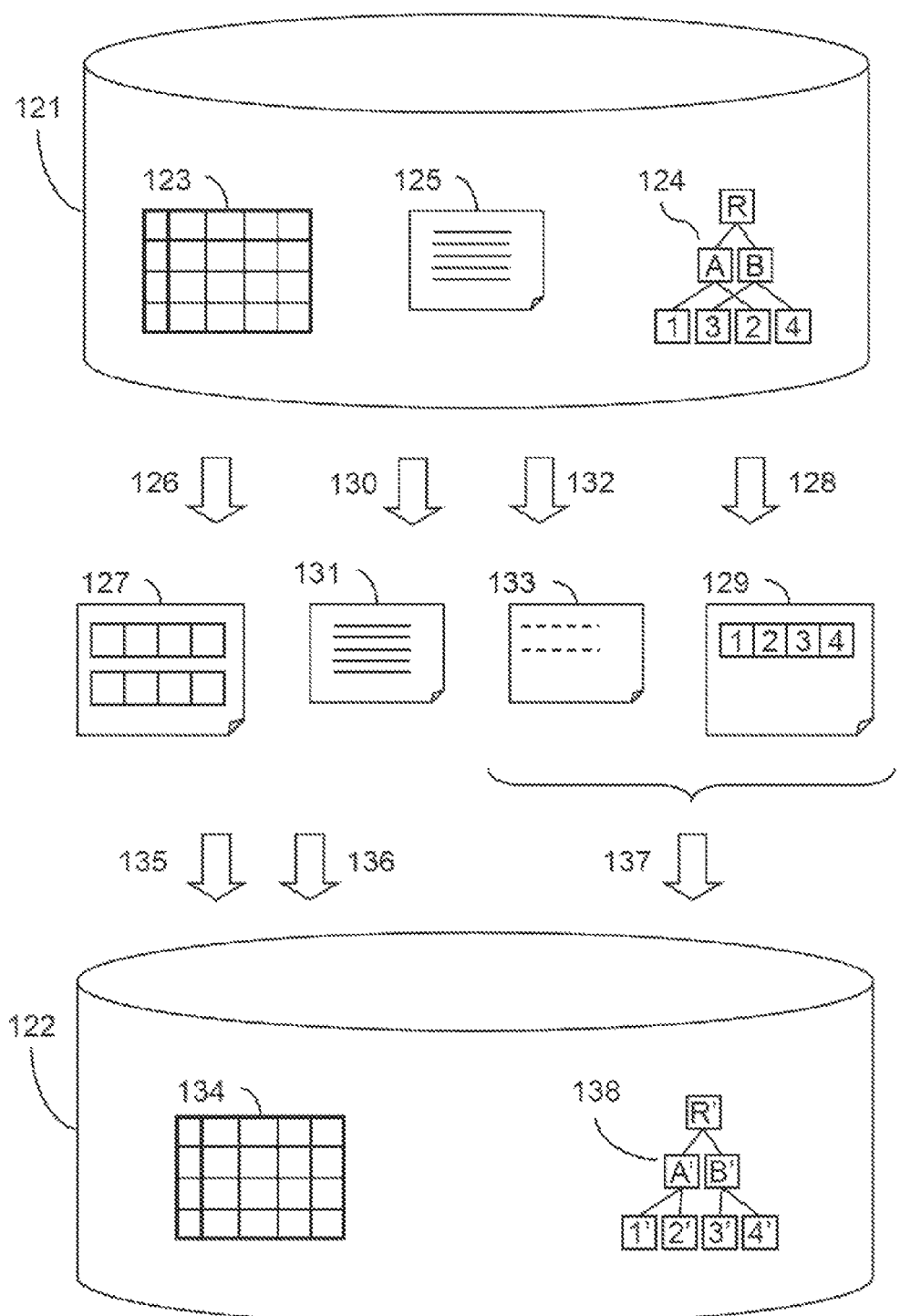
FIG. 1b illustrates a block diagram of an online database copy according to an embodiment of the present invention.

FIG. 1b illustrates a block diagram of an online database backup and restore with integrated index tree reorganization. The source database system (121) comprises database tables (123) and database indices (124) as described in FIG. 1a. In contrast to the offline database backup and restore, the database system is executing database transactions that are recorded in transaction logs (125) during a backup (126) of the table pages to a table backup image (127) and during a backup (128) of the leaf pages to an index backup image (129). When the table backup (126) and the index backup (128) have completed, the online database backup and restore also backups (130) the transaction logs (131). During the online database backup, the source database can additionally extract (132) index change records from the transaction logs (125) and write them to index logs (133). FIG. 2b describes the construction of the index logs. Based on the table backup image (127) and the transaction logs (131), the target database tables (134) are restored (135,136) in the target database system (122) as known in prior art. The restore (137) of the index leaf pages to the target database system is different from the offline database backup and restore in that the index change records are sorted and preferably compacted. The sorted index change records are finally merged with the leaf pages of the index backup image (137) to restore the leaf pages (138: 1', 2', 3', 4'). The non-leaf pages (138: A', B', R') are re-built in the target database system, preferably while restoring the leaf pages.

Figure 2A:
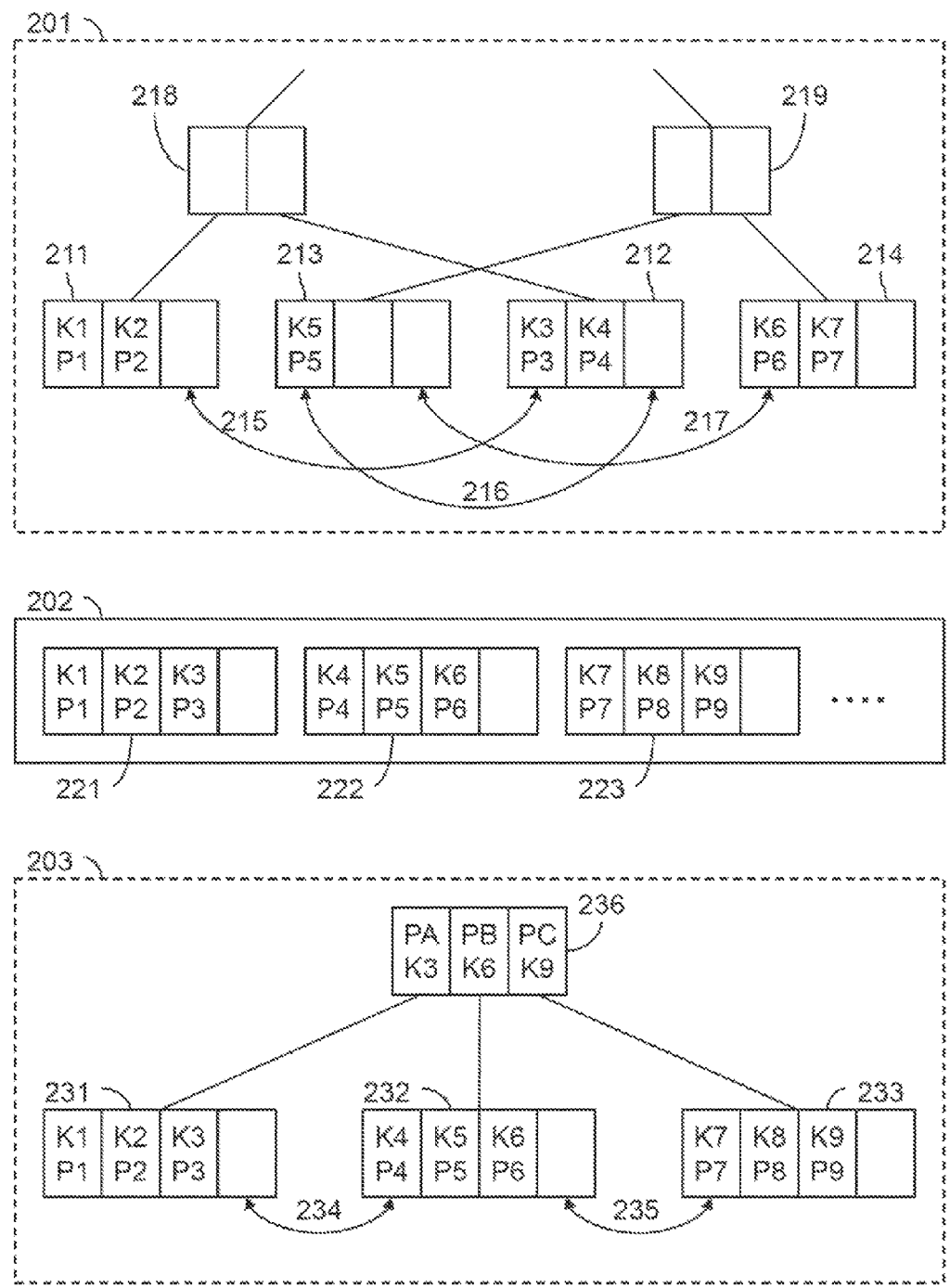
FIGS. 2a illustrates a block diagram of reorganizing database index leaf pages according to an embodiment of the present invention.
Figure 2B:
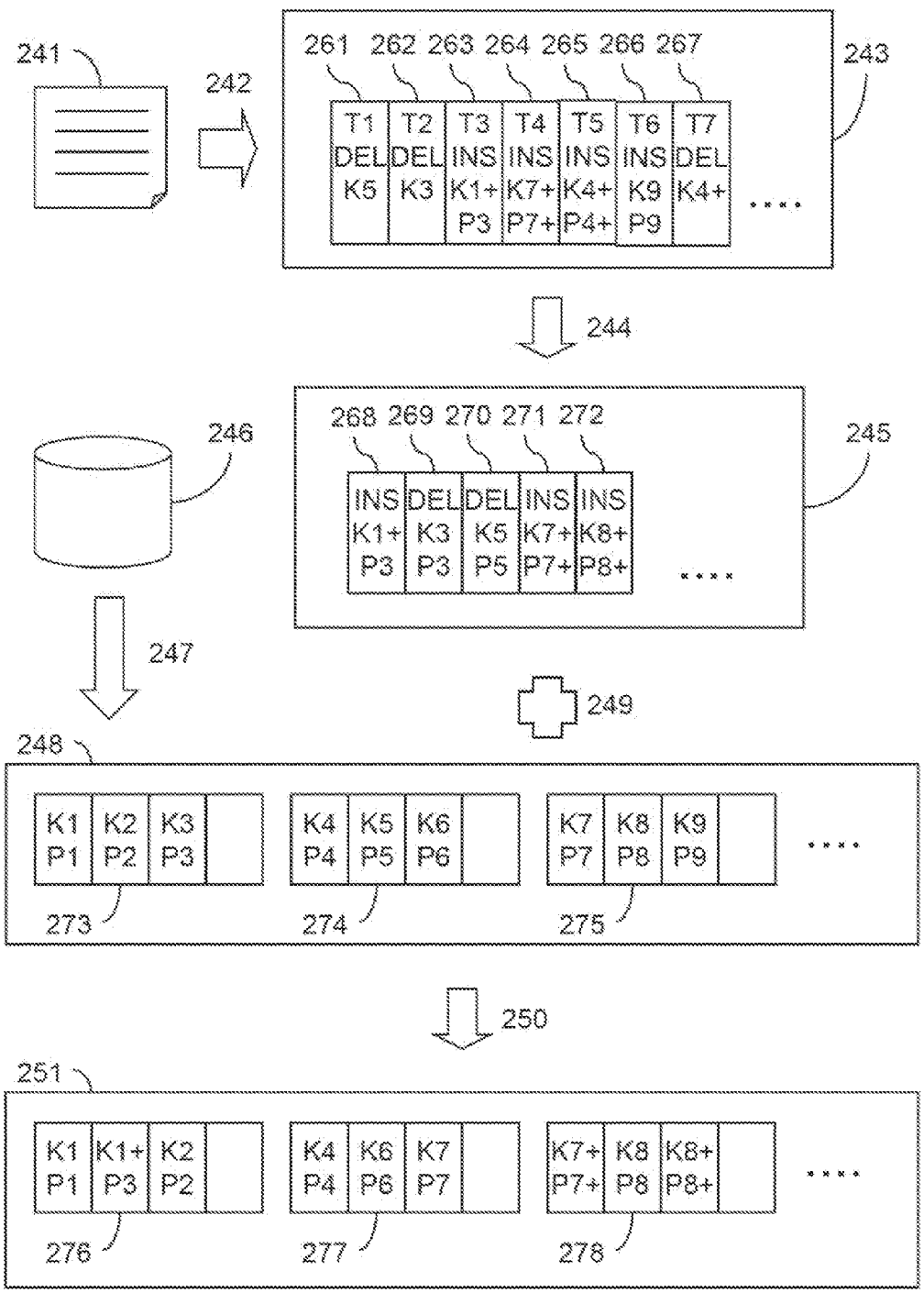
FIG. 2b illustrates a block diagram of merging index logs and leaf pages according to an embodiment of the present invention.

FIG. 2a illustrates a block diagram of reorganizing leaf pages of a database index (201) in the source database system. The database index comprises leaf pages (211, 212, 213, 214) and their parent non-leaf pages (218, 219). The database index is associated with one database table. Each of the leaf pages comprises a set of index records. Each of the index records is identified by a respective index key value K<n> and specifies a pointer P<n> to one of the table rows of the associated database table. In the source database of the present example, each of the leaf pages has storage space for three index records, but the database management component only stores at most two index records in the leaf pages. In most prior art database systems, a block or page storage parameter may be used to specify how much storage space should be left in an index page for further updates. For example, a value of the parameter PCTFREE=10 leaves 10 percent of block storage space for future updates. This free storage space would not be used for insert operations. The PCTFREE parameter is typically pre-determined when a definition of a database index or database indexspace is created or updated. The leaf pages have a logical order (211, 212, 213, 214) according to the sequence of the index keys (K1, K2, . . . , K7). To traverse the logical sequence of leaf pages quickly, that is, subsequently read the leaf pages, each leaf page has a pointer to a preceding leaf page and a pointer to a succeeding leaf page. For example, the leaf page (213) has a pointer (217) to the succeeding leaf page (214) and a pointer (216) to the preceding leaf page (212) in the logical order. The first leaf page (211) has only one pointer (215) to the succeeding leaf page (212). And the last leaf page (214) has one pointer (217) to the preceding leaf page (213). Each of the leaf pages has a respective parent non-leaf page. For example, the leaf page (211) has the parent non-leaf page (218). The non-leaf pages of the source database system are not relevant for the preferred embodiment. The physical order of the leaf pages (211, 213, 212, 211) is different from the logical order. While traversing the leaf pages (211, 212, 213, 214) during a backup of the database index tree in the logical order, the source database system reads index records ((K1, P1), (K2, P2), (K3, P3), ... (K7, P7)) from the leaf pages of the source system, constructs and writes leaf pages (221, 222, 223) to an index backup image (202), distributes the read index records among the constructed leaf pages, and writes the distributed index records to the leaf pages in the logical order. The preferred embodiment allows that the constructed leaf pages can have a different size or a different maximum record number than the leaf pages of the source database system. For example, each of the constructed leaf pages (221, 222, 223) has storage space for four index records. The leaf pages in the target system have a pre-determined maximum record number of three index records. During the restore of the leaf pages from an index backup image, the target database system directly copies the constructed leaf pages (221, 222, 223) to respective storage locations (231, 232, 233) of the target database system (203). Subsequent leaf pages are linked by pointers (234, 235). Preferably, while restoring the leaf pages, the target database system is constructing non-leaf pages with alternating pointers and key values. The pointers (PA, PB, PC) of parent non-leaf page (236) refer to respective storage locations of child pages (231, 232, 233). The key values (K3, K6, K9) are the greatest key values of the respective leaf pages (231, 232, 233).

FIG. 2b illustrates a block diagram of merging index logs and index leaf pages during an online database backup and restore. While the source database system is backing up table pages and leaf pages, the source database system is performing database transactions and changing the contents of the database tables and implicitly the contents of the database indices. Hence, the backup image does not represent a definite state of the source database system. The transaction logs are recording changes of the database tables and indices. The transaction logs allow applying these changes in the target database system after the database restore. The method of the preferred embodiment extracts (242) index change records (261, 262, ..., 267) from the transaction logs (241) and stores the extracted index change records in index logs (243). Each of the index change records specifies a respective timestamp, T<n>, a respective index key value, K<n>, and a respective operation. The operation specifies whether the index record has been deleted (DEL) or inserted (INS) into the source database system. In the case of an insert operation, index change records further specify a pointer, P<n>, to one of the table rows. In the present example, inserted index records (263, 264, 265, 266) are identified by respective new key values. The plus signs indicate that the respective key values are successor key values in the logical order. In the index change record (264), the key value K7+ is the successor of the key value K7 and the predecessor of the key value K8. The pointer P7+ refers to an inserted table row. Deleted index records (261, 262, 267) are identified by respective key values. For example, the index change record (261) deletes the index record with the key value K5 and the pointer P5. The pointer P5 refers to a deleted table row. When a table row is updated, the index log comprises two index change records. For example, when the table row identified by the pointer P3 is updated, two index change records (262, 263) are inserted into the index log: a first index change record (262) because the key value K3 is deleted from the database index and a second index chance record (263) because the key value K1+ is inserted into the database index. The timestamp T<n> information in the index change records is important if a key value occurs multiple times. Then, only the operation associated with the last timestamp T<last> is relevant. For example, the key value K4+ has been inserted (265) at timestamp T5 and deleted (267) at timestamp T7. In this case, the first index change record (265) can be ignored. When a delete operation follows an insert operation for the same key value, even both index change records (265, 267) can be ignored. Index change records that are not relevant can be removed from the index log, which results in a compacted index log. The database manger further sorts (244) the index change records in the order of the key values and stores the sorted and compacted index change records in sorted index logs (245). FIG. 2a has described the backup (247) of the leaf pages (273, 274, 275) from the source database system (246) to an index backup image (248). In an online database backup and restore, the sequence of index change records (245) and the sequence of leaf pages (248) are merged (249, 250) into a new sequence of merged index leaf pages (251) as respective leaf pages (276, 277, 278), which are stored at the respective storage locations of the target database system. The merging step comprises reading information from two sources in an alternating manner: firstly, index records ((K1, P1), (K2, P2), ..., (K8, P8)) from the index backup image (248) and, secondly, index change records (268, ..., 272) from the sorted index logs (245). The merging step further comprises comparing the key values of records from both data sources: When the index record from the index backup image has the lower key value, the index record is inserted into a leaf page of the target database system. When the index change record from the sorted index log has a lower or equal key value, the database management component performs the operation of the index change record. In the case of a delete operation, the index change record is ignored and an index record that has the same key value is not inserted in the target leaf page. In the case of an insert operation, the index change record is inserted into the target leaf page. For example, the index change records (268, 271, 272) insert the index records (K1+, P3), (K7+, P7+), and (K8+, P8+) into the respective leaf pages (276, 278). The index change records (269, 270) remove the respective key values K3 and K5 from the leaf pages (273, 274) of the index backup image (248).

Figure 2C:
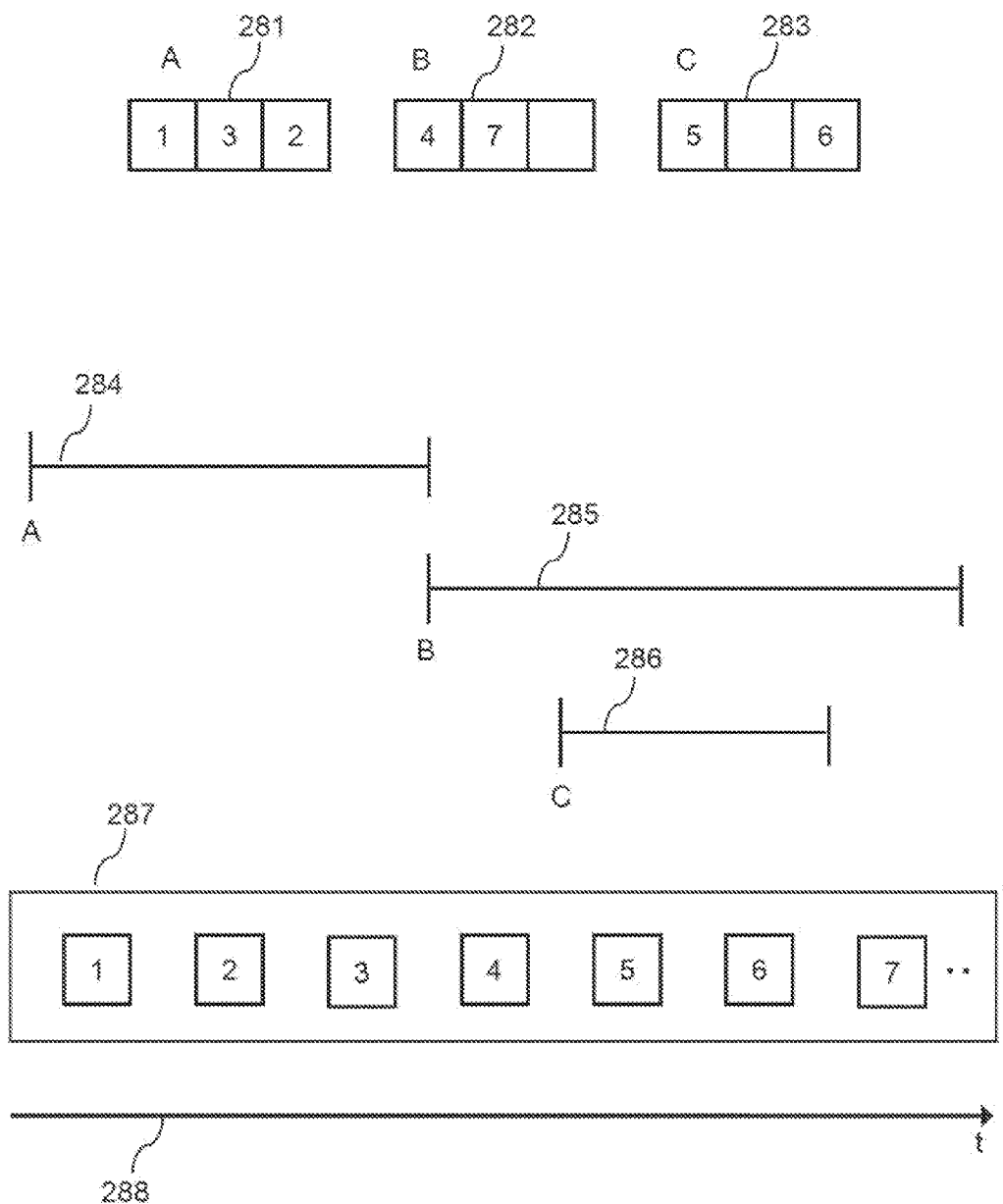
FIG. 2c illustrates a block diagram of a cache for leaf pages according to an embodiment of the present invention.

FIG. 2c illustrates a block diagram of reading leaf pages from the source database system and writing them to a cache. The leaf pages of the source database system are typically stored on external storage devices, for example, on hard disks. Since the database indices are very large, the database management component cannot read all the leaf pages of the index tree and writes them to transient memory. In the memory, the database management component can quickly follow the pointers and traverse the leaf pages in the logical order. When the database management component read the leaf pages from hard disks and wrote them to memory one by one, the reading of index records would become very inefficient because the hard disks may need too many random read access operations. When leaf pages that are subsequent in the logical order are mostly adjacent on the storage devices or only a few storage locations apart, the cache can significantly help to reduce the number of read access operations to the hard disks. When the source database system requests to read a specific leaf page, the database management component checks if the specific leaf page exists in the cache. If the specific leaf page cannot be read from the cache, the database management component reads a chunk of leaf pages including the specific leaf page from the storage device and writes the read chunk to the cache. Then, the database management component reads the specific leaf page from the cache. When all leaf pages of a chunk have been read from the cache, the respective storage locations in the cache are released. In the example of FIG. 2c, each chunk has a size of three index leaf pages. The index leaf pages 1, ..., 7) are subdivided into three chunks A (281), B (282), and C (283) on one of the hard disks.

The time bar (288) indicates a temporal sequence of read operations. In response to a read request for a leaf page (1), the chunk A (281) is read from the hard disk and kept (284) in the cache. The index leaf pages (2) and (3) can be directly read from the cache. After all leaf pages (1, 2, 3) of chunk A have been accessed in the cache, the respective storage locations can be released. In response to a read request for the leaf page (4), the chunk B (282) is read from the hard disk and kept (285) in the cache. At next, only the leaf page (4) is inserted into the backup image (287). When the leaf page (5) is requested, the chunk C (283) is read from the hard disk and kept (286) in the cache while the cache is still keeping the chunk B (285). After the leaf pages (6) and (7) have been written to the index backup image (287), the storage locations of the chunks B and C can respectively be released from the cache.

Figure 3A:
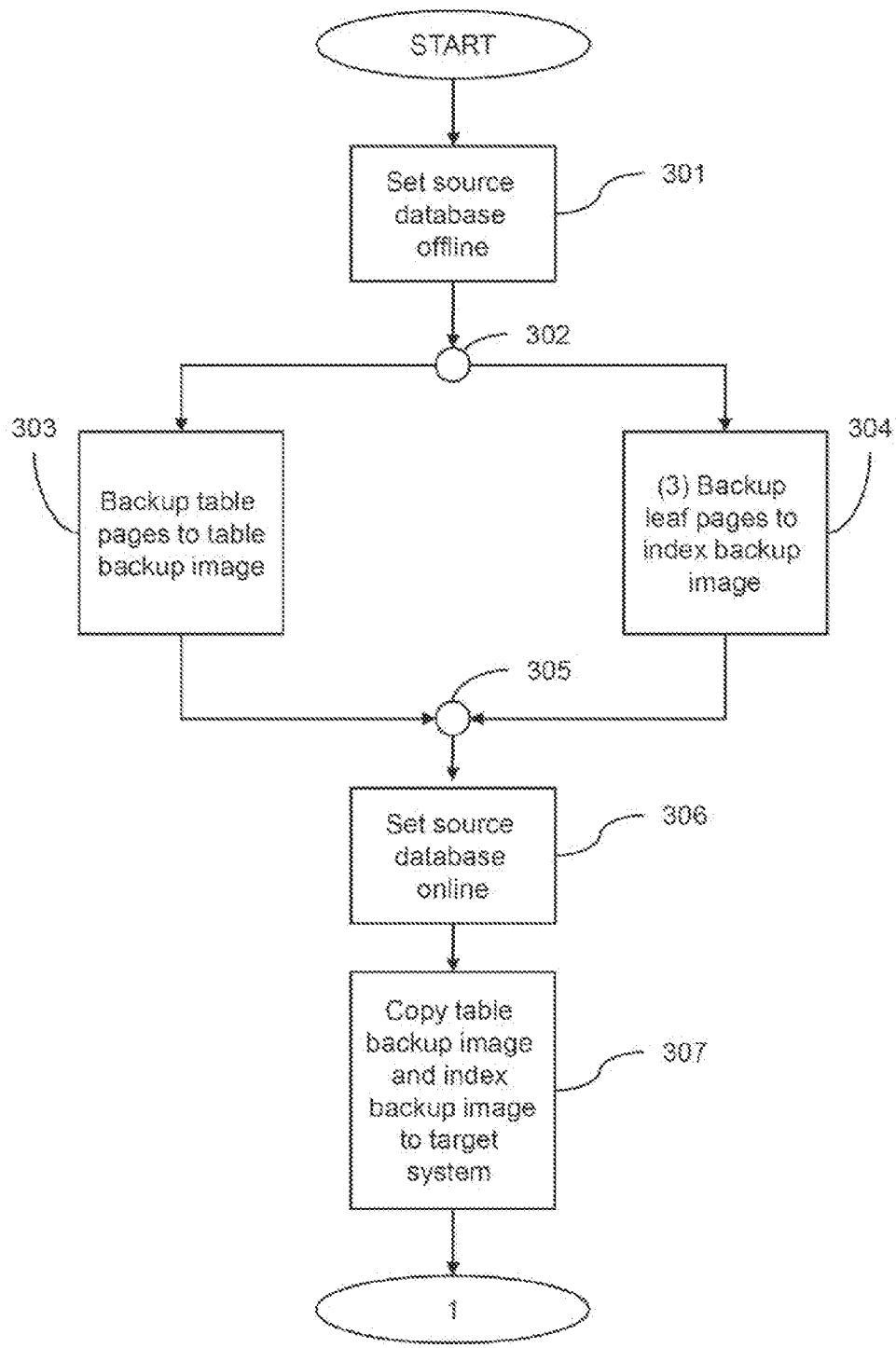
FIG. 3a-b illustrate flow charts of performing an offline database backup and restore according to an embodiment of the present invention.

FIG. 3a illustrates a flow chart of performing the offline database backup from the source database system. For the offline database backup, the source database system is set (301) to the offline state. This means that the source database system is not executing database transactions and the contents of database tables and indices do not change while performing the database backup. After a backup entry point (302), the source database management component can run the following backup processes: a backup (303) of table pages to a table backup image and a backup (304) of leaf pages to an index backup image. The processes (303, 304) can be executed in parallel. The source database management component can further start separate system processes for different groups of database tables and groups of database indices. In some database systems, for example, sets of database tables are assigned to respective tablespaces and sets or database indices are assigned to respective indexspaces. At a backup exit point (305), all backup processes must be finished. Then, the source database system can be set (306) to the online state. The table and index backup images can be copied (307) to the target system that hosts the target database system.

Figure 3B:
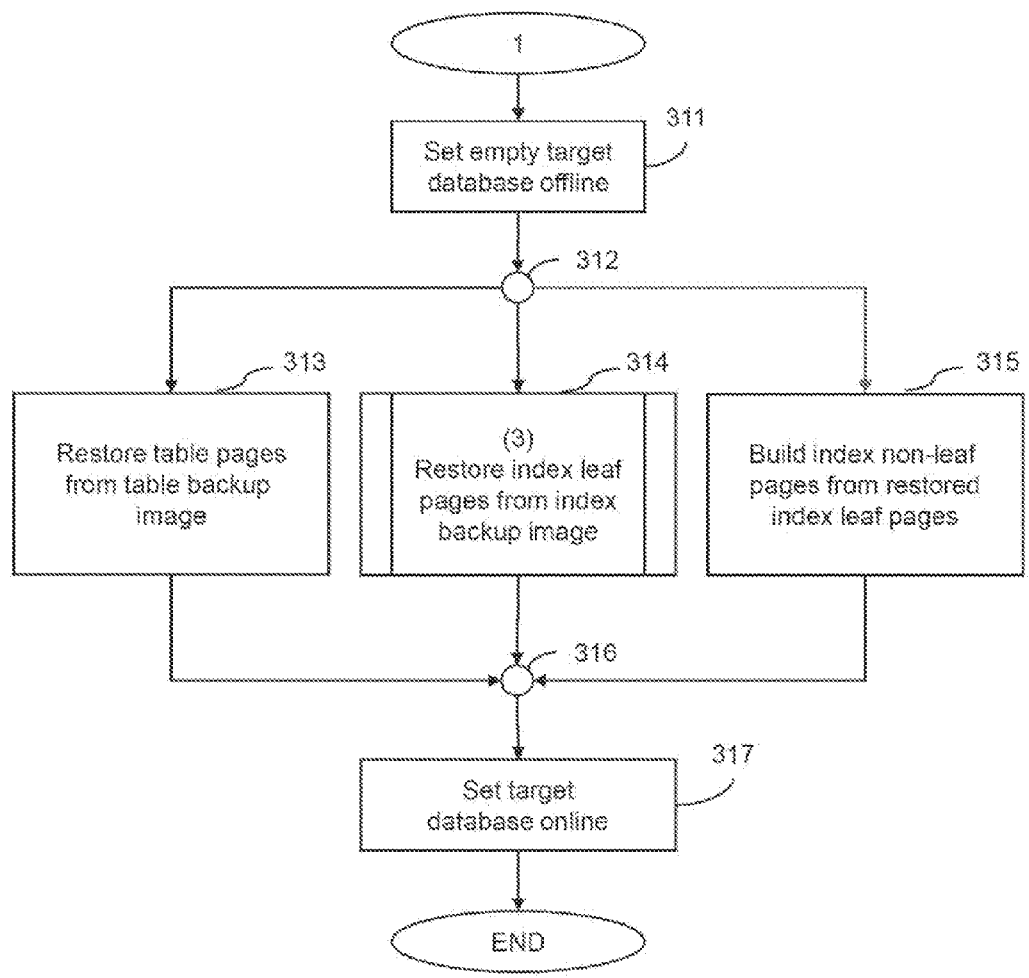

FIG. 3b illustrates a flow chart of a database restore of a target database system from an offline index backup image. The offline index backup image has been created by an offline database backup. For the database restore, an empty target database system is set (311) to the offline state. After a restore entry point (312), the target database management component runs the following processes: a restore (313) of table pages from the table backup image, a restore (314) of leaf pages from the index backup image, and a rebuild (315) of non-leaf pages from the restored index leaf pages. The processes (313, 314, 315) can be executed in parallel. The rebuild process (315) can be preferably started as a child process of the parent process restoring (314) the leaf pages. The target database management component can further start separate system processes for different groups of database tables and database indices. The sub-steps of restoring (314) the leaf pages from an offline index backup image are described in FIG. 3e. After all restore (313, 314) and rebuild (315) processes have finished at a restore exit point (316), the target database system can be set (317) to the online state.

Figure 3C:
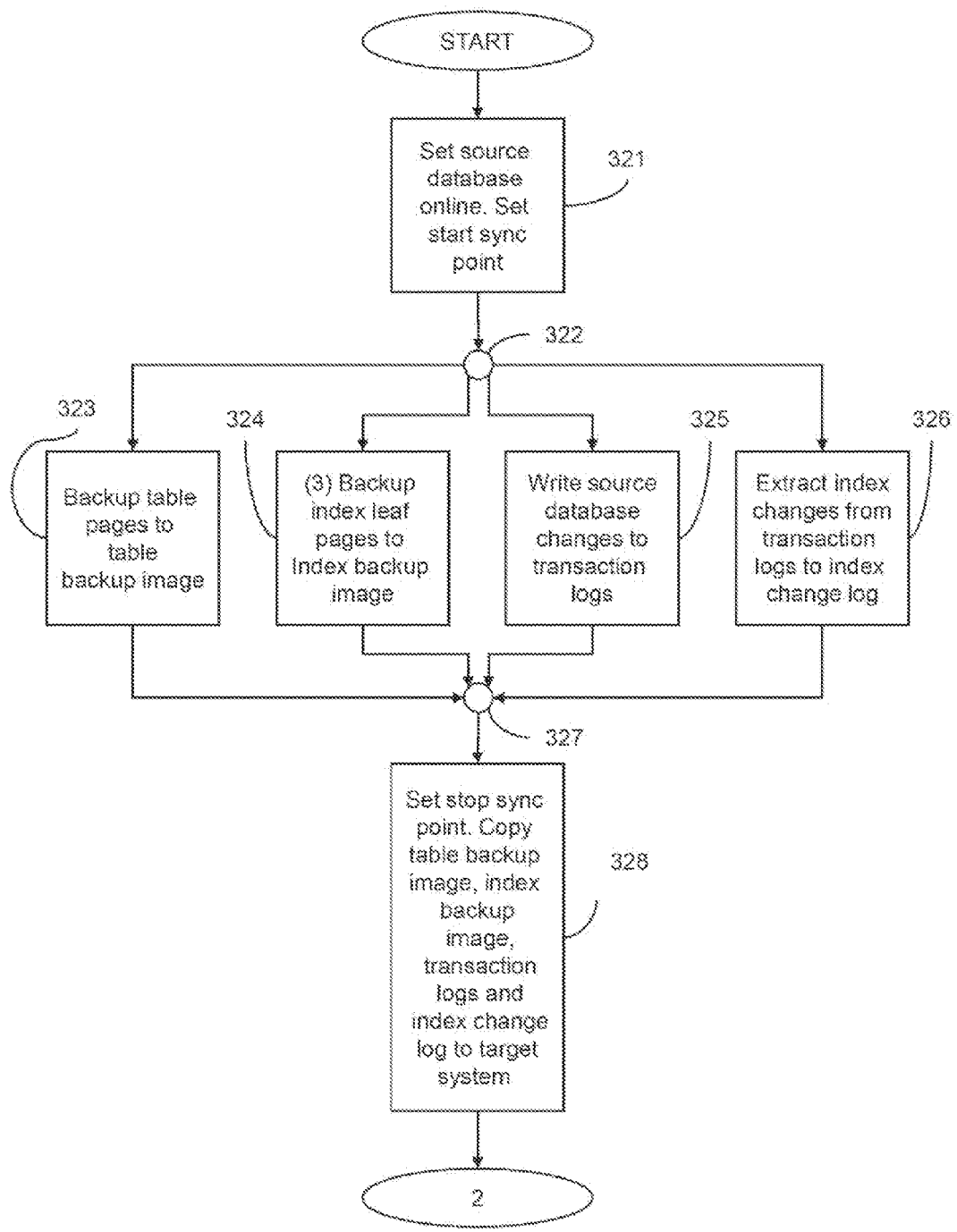
FIG. 3c-d and 3f-g illustrate flow charts of performing an online database backup and restore according to an embodiment of the present invention.

FIG. 3c illustrates a flow chart of an online database backup from the source database system. For the online database backup, the source database management component sets (321) the source database system to the online state and records a start sync point in the transaction logs. In contrast to the offline database backup, the source database system is still executing database transactions and the contents of database tables and indices are changing while performing the database backup. The database system is recording (325) these changes in the transaction logs. After a backup entry point (322), the source database management component can run the following processes: a backup (323) of table pages to a table backup image and a backup (324) of leaf pages to an index backup image. The processes (323, 324) can be executed in parallel. Further processes can extract (326) index changes from the transaction logs after the start sync point (322) and write index change records to index logs. These extract (326) processes can preferably run as child processes of the parent processes writing (325) the transaction logs. The source database management component can further start separate system processes for different groups of database tables and groups of database indices and different transaction logs. At a backup exit point (327), all backup processes (323, 324) must have finished. The source database management component records (328) a stop sync point in the transaction logs and stops writing the index logs. The table backup image, the index backup image, the transaction logs and possibly the index logs can be copied (328) to the target system that hosts the target database system.

Figure 3D:
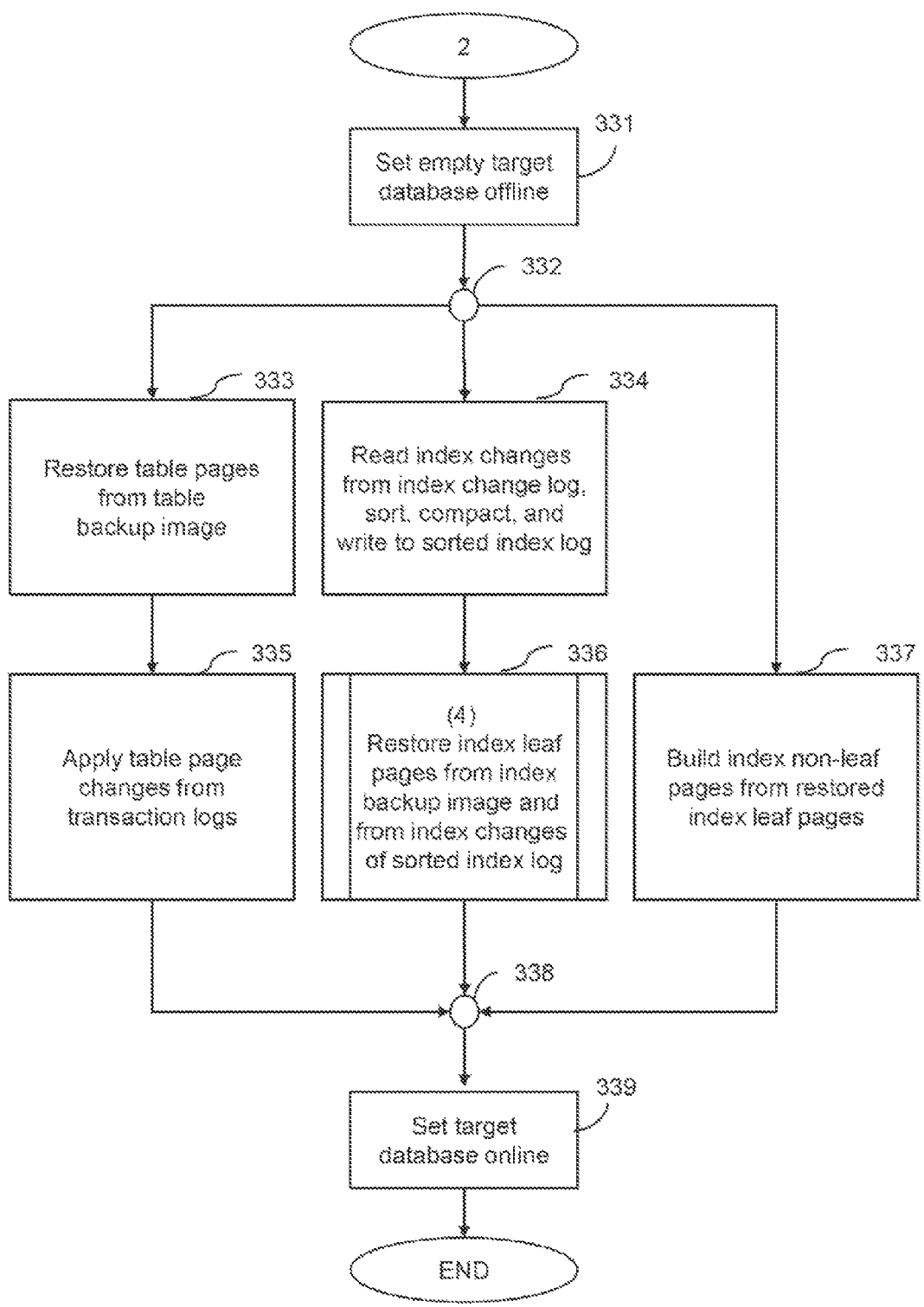

FIG. 3d illustrates a flow chart of a database restore of a target database system from an online index backup image. The online index backup image has been created by an online database backup. For the database restore, an empty target database system is set (331) to the offline state. After a restore entry point (332), the target database management component can run the following processes: a restore (333) of table pages from the table backup image, a restore (336) of leaf pages from the index backup image, and a rebuild (337) of non-leaf pages from the restored leaf pages. The processes (333, 336, 337) can be executed in parallel. As known in the prior art, the table pages must be completely restored (333) from the table backup image before the table page changes are applied (335) from the transaction logs. In contrast to the database restore in an offline database backup and restore, the restore (336) of the leaf pages requires the following preparation step: The target database management component reads (334) index change records from the index logs, sorts the index change records by the key values, compacts the index change records based on the recorded timestamps, and writes the sorted index change records to sorted index logs. For details, see the description of FIG. 2b. The sorting step (334) must be completed for all index logs and transaction logs from the source database system before restoring (336) the leaf pages in the target system. This restore step (336) merges the leaf pages from the index backup image and the index change records from the sorted index logs. The rebuild (337) processes can preferably be started as child processes of the parent processes restoring (336) the leaf pages. The target database management component can further start separate system processes for restoring different groups of database tables and database indices. The sub-steps of restoring the leaf pages from an online index backup image are described in FIG. 3f and FIG. 3g. After all restore processes (333, 335, 336) and all rebuild processes (337) have finished at a restore exit point (338), the target database system can be set (339) to the online state.

Figure 3E:
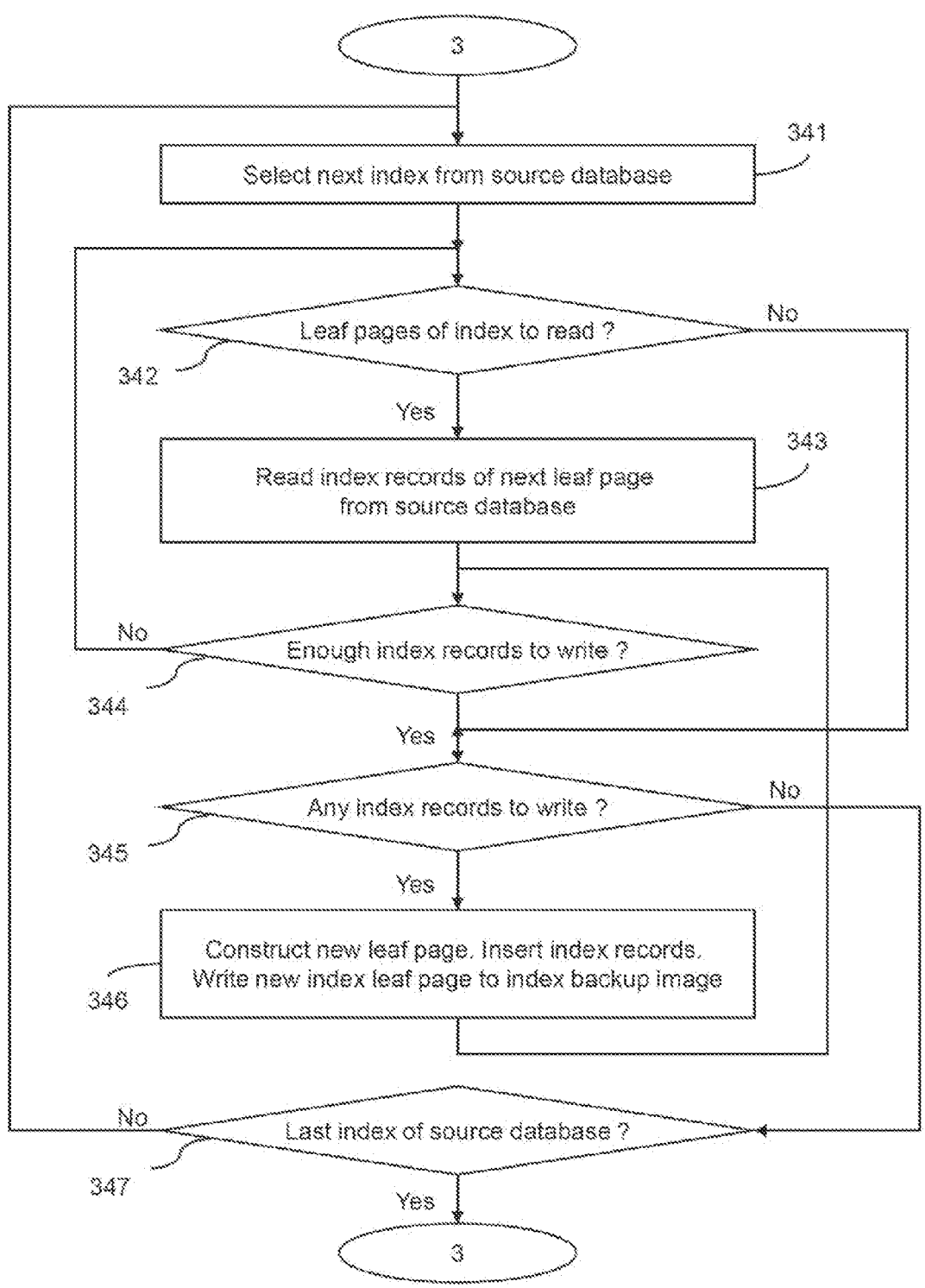
FIG. 3e illustrates a flow chart of performing a backup of leaf pages according to an embodiment of the present invention.

FIG. 3e illustrates the sub-steps of backing up the leaf pages. These sub-steps refer to both the leaf pages backup step (304) for the offline case shown in FIG. 3a and the leaf pages backup step (324) for the online case shown in FIG. 3c. The following steps are executed by the source database management component, which is also called database management component. The database management component selects (341) the next database index from the source database. The database management component checks (342) if it can still read leaf pages from the selected database index. If the answer is "yes" (342, "yes"), the database management component reads (343) the index records of the next leaf page of the selected database index. The database management component checks (344) if the reading step (343) has returned more index records than the maximum record number for the target database system. In the negative case (344, "no"), the database management component tries to read (343) the index records of the next leaf page of the database index. In the positive case (344, "yes"), the database management component checks (345) if any index records can be written to the index backup image, which is usually true (345, "yes"). The database management component constructs (346) a new leaf page and inserts the read index records into the constructed leaf page up to the maximum record number for the target database system. The database management component finally writes the leaf page with the inserted index records to the index backup image. When no more index records of the database index can be written (345, "no") to the index backup image, the database management component checks (347) if the source database system has more indices and possibly selects (341) the next database index for the index backup.

Figure 3F:
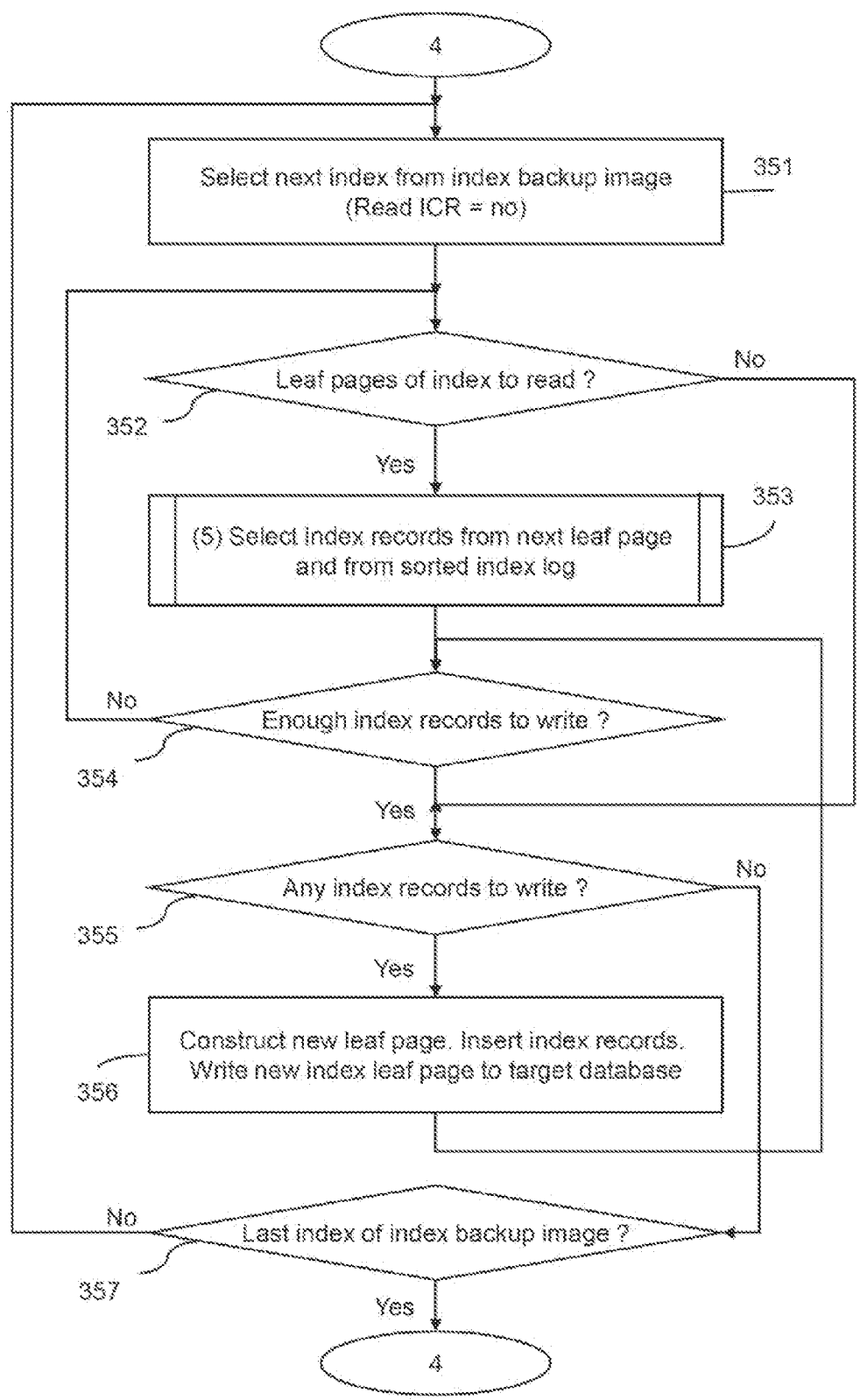

FIG. 3f illustrates the detailed sub-steps restoring (336) the leaf pages from an index backup image of an online database backup as shown in FIG. 3d. The following steps are executed by the target database management component, which is also called database management component. The database management component selects (351) the next database index from she index backup image. The database management component checks (352) if it can still read leaf pages of the selected database index. If the answer is "yes" (352, "yes"), the database management component selects (353) index records from the next leaf page and from the sorted index logs. The details of the selecting step (353) are described in FIG. 3g and FIG. 2b. The database management component checks (354) if the selecting step (353) has returned more index records than the maximum record number for the target database system. In the negative case (354, "no"), the database management component tries (353) to read the next leaf page of the database index. In the positive case (354, "yes"), the database management component checks (355) if any index records can be written to the target database system, which is usually true (355, "yes"). The database management component constructs (356) a new leaf page and inserts the selected index records into the constructed leaf page up to the maximum record number for the target database system. The database management component finally writes the constructed leaf page with the inserted index records to the target database system. The database management component checks (354) again if the number of selected index records that have not yet been written to the leaf pages exceeds the maximum record number. When the database management component cannot read (352, "no") any more leaf pages from the selected database index, that is, after the last leaf page, the database management component checks (355) if any records can be written to the target database and inserts (356) the remaining index records into the constructed leaf pages that are stored in the target database system. When no more index records of the database index can be written (355, "no") to the target database, the database management component checks (357) if the index backup image has more database indices and possibly selects (351) the next database index for restoring the leaf pages.

Figure 3G:
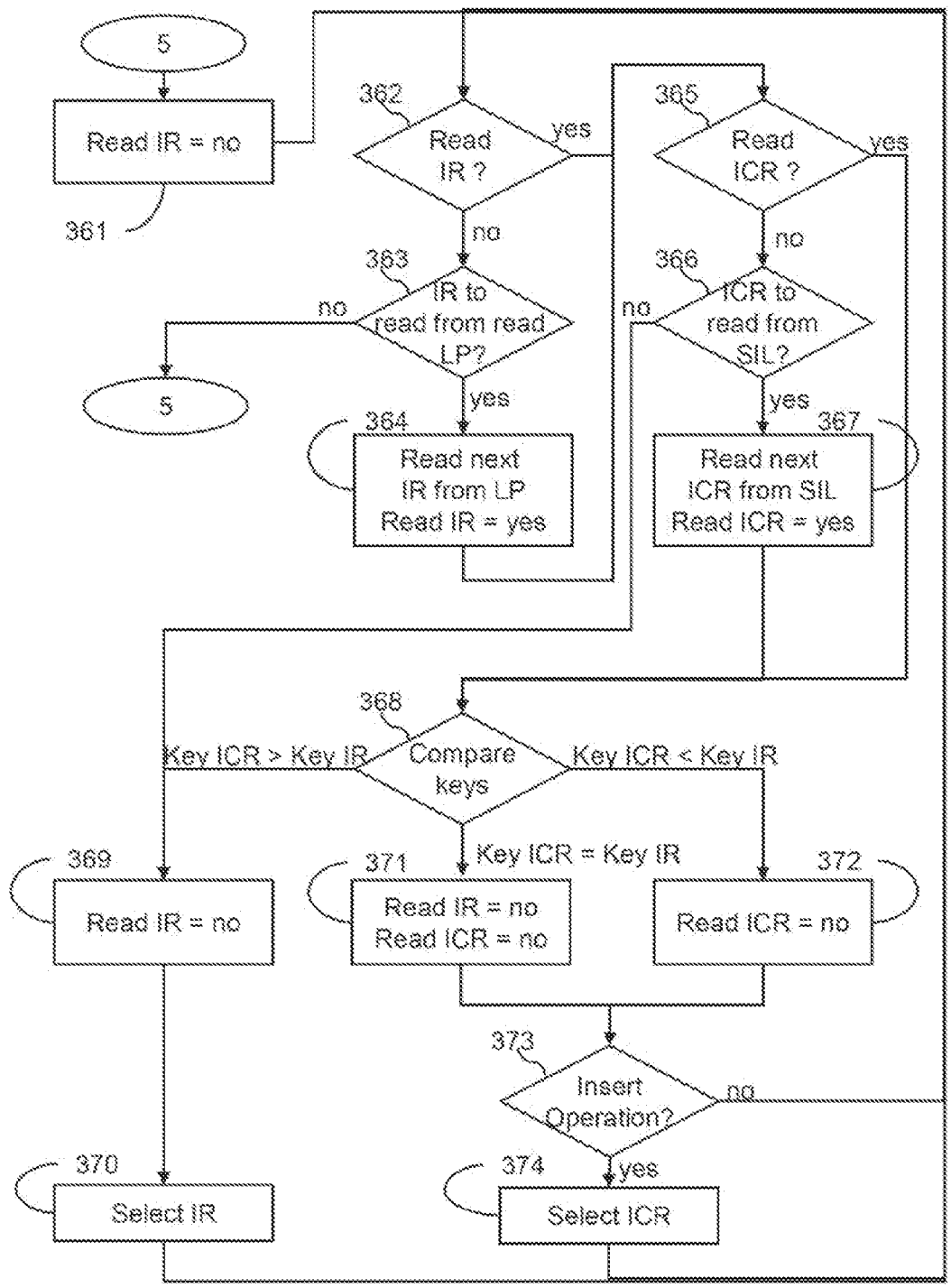

FIG. 3g illustrates the sub-steps selecting (353) the index records from the next leaf page of the index backup image and from the sorted index logs as described in FIG. 3f. This selecting step (353) uses two control variables "Read IR" and "Read ICR". The variable "Read IR" indicates if the next index record (IR) has already been read from the index backup image. The variable "Read ICR" indicates if the next index change record (ICR) has already been read from the sorted index log. In FIG. 3f, the database management component initializes (341) the variable "Read ICR" and sets it to the value "no" before reading the first leaf page of a database index. In FIG. 3g, the database management component initializes (361) the variable "Read IR" and sets it to the value "no" before reading the first index record of a leaf page. The database management component checks (362) the variable "Read IR". When the database management component has not yet read (362, "no") the next index record (IR) of the leaf page (LP), the database management component further checks (363) if it can still read index records of the leaf page. In the positive case (363, "yes"), the database management component reads (364) the next index record from the leaf page and sets the control variable "Read IR" to "yes". The database management component checks (365) the variable "Read ICR". When the database management component has not yet read (365, "no") the next index change record (ICR) from the sorted index log (SIL), the database management component further checks (366) if it can still read index change records for the selected database index. In the positive case (366, "yes"), the database management component reads (367) the next index change record from the sorted index log and sets the control variable "Read ICR" to "yes". When the control variable "Read IR" already has (362, "yes") the value "yes", the database management component directly checks (365) the control variable "Read ICR". When no more index records can be read (363, "no") from the leaf page, the selecting step (353) has finished. It can happen that the database management component cannot read (366, "no") the next index change record for the selected database index because no more index changes have been extracted from the transaction logs for the selected database index. In this case (366, "no"), the database management component selects (370) the next read index record to be inserted into a constructed leaf page. If a next index change record (ICR) and a next index record (IR) have been read ("Read IR"="yes" and "Read ICR"="yes"), the database management component compares (368) the key values of the read index record from the leaf page and the read index change record from the sorted index log. If the key value of the index record (IR) is less than (368, left branch) the key value of the index change record (ICR), the index record is selected (370) to be inserted into the constructed leaf page. The control variable "Read IR" is set (369) to "no" to enable reading the next index record (IR). If the key values of the index record and of the index change record are equal (368, bottom branch), the database management component sets (371) both control variables "Read IR" and "Read ICR" to "no" to enable reading both the next index record (IR) and the next index change record (ICR). If the key value of the index change record (ICR) is less than (368, right branch) the key value of the index record (IR), the database management component only sets (372) the control variable "Read ICR" to "no". In both cases, when the key value of the index change record (ICR) is less than or equal (368, right and bottom branches) to the key value of the index record (IR), the database management component checks (373) if the operation of the index change record (ICR) is an insert operation. In the positive case (373, "yes"), the database management component selects (374) the index change record to be inserted into the constructed leaf page. In the negative case (373, "no"), the database management component ignores the key value of the index change record and tries to read (362) the next required key values.

FIG. 4 illustrates a table (400) of database backup and restore duration samples with separate and with integrated database index reorganization. A model calculation of execution times (401) is based on a B+ index tree and a single processor system. The following numbers specify the B+ index tree: b is the order of the index tree, h is the height of the index tree, and m is the total number of index records in the leaf nodes. The order b of the index tree is typically the number of child nodes of a parent node and the number of index records in a leaf node. The height h of the index tree can be estimated by the formula, $h=\log_b m$. The number of non-leaf pages is proportional to the total number m of index records in the leaf pages, but usually much smaller than the number m, if the order b of the index tree, for example, 100 to 300, is much larger than one. The rebuild of the non-leaf pages is typically executed in child processes of parent processes that write the leaf pages to the target database. The time for this rebuild can be neglected in comparison with the time required for sequentially reading or writing the leaf pages. In a prior art database backup and restore (402, left), the duration of a prior backup step (405) for a database index tree is estimated to be of the order $O[m]$. A prior art restore step (406) for a database index restores all leaf pages and non-leaf pages to the target database system. The prior art backup (405) and restore (406) of the index pages can be omitted. Afterwards, a reorganization of the restored database index sorts all index keys and writes back the reorganized database index to the target database system. The time needed for this sort step significantly grows with the number of index records, which can be estimated by the formula $O[m \log(m)]$. According to the preferred embodiment (402, right), the backup (407) and the restore (408) for a database index spend most of the time in sequentially reading and writing the leaf pages. The estimated durations for both the backup and the restore are of the order $O[m]$. The model calculation assumes that one operational step takes about 1 microsecond, a page has a size of 32 KB, and an average record has a size of 100 Bytes. The table of FIG. 4 shows the estimated duration (401) for database backup and restore operations (403) for database indices with different numbers of index records (404). The example durations have been calculated for a small size database index (409) with $10^4$ index records, a medium size database index (410) with $10^6$ index records, a large database index (411) with $10^9$ index records, and a huge size database index (412) with $10^{12}$ index records. Depending on the database size, the model calculation results in durations between 0.01 seconds and 12 days for the backup step (407) and the restore step (408) according to the preferred embodiment and for the backup step (405) according to prior art. Due to the sorting step, the prior art restore step (406) with subsequent reorganization of the database index in the target database system needs significantly more time. The model calculation estimates durations between 0.05 seconds and even 5 months. The model calculation shows that the preferred embodiment can vastly reduce the duration of the database backup and restore compared to prior art when the database restore step integrates a reorganization of the database indices.

The online database backup and restore with integrated index reorganization can alternatively perform a few steps at different times:

1. The extract step (326) of the index logs from the transaction logs as shown in FIG. 3c could also be performed independently after the online database backup described in FIG. 3c and before the corresponding online database restore as described in FIG. 3d.
2. The extract step (326) as depicted in FIG. 3c could also be included in the step (334) of the database restore shown in FIG. 3d before sorting the extracted index records.
3. The sorting step (334) as shown in FIG. 3d could also be performed independently before the online database restore, but not before setting (328) the stop sync point in the source database system at the end of the online database backup as described in FIG. 3c.
4. The restore step (336) as shown in FIG. 3d comprises merging the index records from the leaf pages and the sorted index change records. The merged index records can alternatively be written to copy storage locations before writing the constructed target leaf pages to target storage locations of the target database system.

Instead of extracting index change records from transaction logs and writing them to index logs and writing the sorted index change records to sorted index logs, the source and target database management components could also write the extracted and sorted index change records to temporary data structures of their local file systems.

In a first alternative embodiment, the backup and restore steps are not performed by respective source and target database management components, but by only one database management component. The database management component firstly performs the backup steps and secondly the restore steps. Preferably, the backup steps may comprise writing the constructed target leaf pages to respective copy storage locations. And the restore steps may comprise reading the target leaf pages from the respective copy storage locations. The copy storage locations may reside temporarily on a copy storage device, which is separate from the source and target storage devices.

In a second alternative embodiment, the method is not restricted to B+ trees, but can be applied to other index tree structures where only a subset of index pages contains index records of the database index. Examples for other index tree structures are so-called R-trees, which have data structures similar to B-trees, but are used for spatial access methods, that is, for indexing multi-dimensional information. The data structure splits space with hierarchically nested and possibly overlapping, minimum bounding rectangles (MBRs). Each node of an R-tree has a variable number of entries. Each entry within a non-leaf node stores two pieces of data: a pointer to a child node and a bounding box of all entries within this child node. The leaf nodes store entries that may have a corresponding structure to the entries of the non-leaf nodes. These leaf entries, however, refer to table rows instead of child nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited for an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood That each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or the programmable data processing apparatus, create means for implementing the functions/acts specified in the flowchart and/or block diagram block or blocks.

These computer program instructions may also be stored in a computer readable medium that can direct a computer, other programmable data processing apparatus, or other devices so function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of she present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method utilizing at least a computer for reorganizing a source index tree of a database table resulting in a target index tree of the database table, the method comprising:

performing a backup of the source index tree from respective source storage locations, wherein the source index tree comprises source leaf pages and source non-leaf pages, wherein the source leaf pages comprise index records specifying respective index keys and respective table row identifiers of the database table, a source logical order defined by a sequence of the respective index keys of the index records, and a source physical order defined by a sequence of the respective source storage locations, wherein the source physical order of the source leaf pages being possibly different from the source logical order of the source leaf pages, and wherein the performing the backup of the source index tree from the respective source storage locations comprises:

determining the sequence of the respective source storage locations according to the source logical order of the source leaf pages, reading the source leaf pages from the respective source storage locations according to the determined sequence of the respective source storage locations, wherein the reading the source leaf pages further comprises:

receiving a read request for reading a specific source leaf page from a specific source storage location;

reading a chunk of source leaf pages from the respective source storage locations in response to the read request, the specific source leaf page being a member of the chunk of source leaf pages;

writing the read chunk of source leaf pages to cache storage locations according to the source physical order of the read source leaf pages;

determining a sequence of the cache storage locations according to the source logical order of the source leaf pages; and reading the source leaf pages from the cache storage locations according to the determined sequence of the cache storage locations, and constructing target leaf pages of the target index tree, the target leaf pages having copies of the index records and a target logical order defined by a sequence of the index keys of the copies of the index records; and performing a restore of the target index tree at respective target storage locations, wherein performing the restore of the target index tree at the respective target storage locations comprises:

writing the constructed target leaf pages to the respective target storage locations defining a target physical order of the target leaf pages, the target physical order corresponding to the target logical order of the target leaf pages, constructing target non-leaf pages of the target index tree based on distribution of the index keys among the constructed target leaf pages, and writing the constructed target non-leaf pages to the respective target storage locations.

2. The method of claim 1, wherein a source database management component performs the backup step and a target database management component performs the restore step, and wherein the method further comprises:

writing the constructed target leaf pages to respective copy storage locations by the source database management component; and reading the constructed target leaf pages from the respective copy storage locations by the target database management component.

3. The method of claim 1, wherein a database management component performs the backup step and the restore step.

4. The method of claim 1, wherein constructing the target leaf pages further comprises:

reading the index records from the read source leaf pages;

distributing the read index records among multiple sets of sorted index records, the sets having pre-defined maximum numbers of index records, and thereby maintaining a sequence of the respective index keys of the distributed index records;

constructing respective target leaf pages having a pre-defined size; and inserting the sets of sorted index records into the respective constructed target leaf pages.

5. The method of claim 1, wherein constructing the target leaf pages further comprises:

copying the source leaf pages to respective target leaf pages, and thereby maintaining a distribution of the index records.

6. The method of claim 1, wherein each source or target leaf page comprises at least one of the following: a reference to a respective predecessor leaf page and a reference to a respective successor leaf page, and wherein the predecessor leaf page, the leaf page, and the successor leaf page are defined by the logical order of the source or target leaf pages respectively, and the references to predecessor and successor leaf pages are associated with respective storage locations.

7. The method of claim 1, wherein, while a first operating system process is writing the constructed target leaf pages, a second operating system process is constructing and writing the target non-leaf pages according to the distribution of the index records among the written target leaf pages.

8. A computer program product for reorganizing a source index tree of a database table resulting in a target index tree of the database table, the computer program product comprising a non-transitory computer readable storage medium having computer readable program code embodied thereon, wherein the computer readable program code, when executed on a computing device, causes the computing device to:

perform a backup of the source index tree from respective source storage locations, wherein the source index tree comprises source leaf pages and source non-leaf pages, wherein the source leaf pages comprise index records specifying respective index keys and respective table row identifiers of the database table, a source logical order defined by a sequence of the respective index keys of the index records, and a source physical order defined by a sequence of the respective source storage locations, wherein the source physical order of the source leaf pages being possibly different from the source logical order of the source leaf pages, and wherein the computer readable program code to perform the backup of the source index tree from the source storage locations further causes the computing device to:

determine the sequence of the respective source storage locations according to the source logical order of the source leaf pages, read the source leaf pages from the respective source storage locations according to the determined sequence of the respective source storage locations, wherein the computer readable program code to read the source leaf pages further causes the computing device to:

receive a read request for reading a specific source leaf page from a specific source storage location;

read a chunk of source leaf pages from the respective source storage locations in response to the read request, the specific source leaf page being a member of the chunk of source leaf pages;

write the read chunk of source leaf pages to cache storage locations according to the source physical order of the read source leaf pages;

determine a sequence of the cache storage locations according to the source logical order of the source leaf pages; and read the source leaf pages from the cache storage locations according to the determined sequence of the cache storage locations, and construct target leaf pages of the target index tree, the target leaf pages having copies of the index records and a target logical order defined by a sequence of the index keys of the copies of the index records; and perform a restore of the target index tree at respective target storage locations, wherein the computer readable program code to perform the restore of the target index tree at target locations further causes the computing device to:

write the constructed target leaf pages to the respective target storage locations defining a target physical order of the target leaf pages, the target physical order corresponding to the target logical order of the target leaf pages, construct target non-leaf pages of the target index tree based on distribution of the index keys among the constructed target leaf pages, and write the constructed target non-leaf pages to the respective target storage locations.

9. The computer program product of claim 8, wherein the computer readable program code further causes the computing device to:

write the constructed target leaf pages to respective copy storage locations by the source database management component; and read the constructed target leaf pages from the respective copy storage locations by the target database management component.

10. The computer program product of claim 8, wherein the computer readable program code to construct the target leaf pages further causes the computing device to:

read the index records from the read source leaf pages;

distribute the read index records among multiple sets of sorted index records, the sets having pre-defined maximum numbers of index records, and thereby maintaining a sequence of the respective index keys of the distributed index records;

construct respective target leaf pages having a pre-defined size; and insert the sets of sorted index records into the respective constructed target leaf pages.

11. The computer program product of claim 8, wherein the computer readable program code to construct the target leaf pages further causes the computing device to:

copy the source leaf pages to respective target leaf pages, and thereby maintaining a distribution of the index records.

12. The computer program product of claim 8, wherein each source or target leaf page comprises at least one of the following: a reference to a respective predecessor leaf page and a reference to a respective successor leaf page, and wherein the predecessor leaf page, the leaf page, and the successor leaf page are defined by the logical order of the source or target leaf pages respectively, and the references to predecessor and successor leaf pages are associated with respective storage locations.

13. An apparatus for reorganizing a source index tree of a database table resulting in a target index tree of the database table, the apparatus comprising:

a computer processor; and a computer memory coupled to the computer processor, wherein the computer memory comprises instructions which, when executed by the computer processor, cause the computer processor to:

perform a backup of the source index tree from respective source storage locations, wherein the source index tree comprises source leaf pages and source non-leaf pages, wherein the source leaf pages comprise index records specifying respective index keys and respective table row identifiers of the database table, a source logical order defined by a sequence of the respective index keys of the index records, and a source physical order defined by a sequence of the respective source storage locations, wherein the source physical order of the source leaf pages being possibly different from the source logical order of the source leaf pages, and wherein the instructions to perform the backup of the source index tree from the source storage locations further causes the computer processor to:

determine the sequence of the respective source storage locations according to the source logical order of the source leaf pages, read the source leaf pages from the respective source storage locations according to the determined sequence of the respective source storage locations, wherein the instructions to read the source leaf pages further causes the computer processor to:

receive a read request for reading a specific source leaf page from a specific source storage location;

read a chunk of source leaf pages from the respective source storage locations in response to the read request, the specific source leaf page being a member of the chunk of source leaf pages;

write the read chunk of source leaf pages to cache storage locations according to the source physical order of the read source leaf pages;

determine a sequence of the cache storage locations according to the source logical order of the source leaf pages; and read the source leaf pages from the cache storage locations according to the determined sequence of the cache storage locations, and construct target leaf pages of the target index tree, the target leaf pages having copies of the index records and a target logical order defined by a sequence of the index keys of the copies of the index records; and perform a restore of the target index tree at respective target storage locations, wherein the instructions to perform the restore of the target index tree at target locations further causes the computer processor to:

write the constructed target leaf pages to the respective target storage locations defining a target physical order of the target leaf pages, the target physical order corresponding to the target logical order of the target leaf pages, construct target non-leaf pages of the target index tree based on distribution of the index keys among the constructed target leaf pages, and write the constructed target non-leaf pages to the respective target storage locations.

14. The apparatus of claim 13, wherein the instructions further cause the computer processor to:

write the constructed target leaf pages to respective copy storage locations by the source database management component; and read the constructed target leaf pages from the respective copy storage locations by the target database management component.

15. The apparatus of claim 13, wherein the instructions to construct the target leaf pages further cause the computer processor to:

read the index records from the read source leaf pages;

distribute the read index records among multiple sets of sorted index records, the sets having pre-defined maximum numbers of index records, and thereby maintaining a sequence of the respective index keys of the distributed index records;

construct respective target leaf pages having a pre-defined size; and insert the sets of sorted index records into the respective constructed target leaf pages.

16. The apparatus of claim 13, wherein the instructions to construct the target leaf pages further cause the computer processor to:

copy the source leaf pages to the respective target leaf pages, and thereby maintaining a distribution of the index records.

17. The apparatus of claim 13, wherein each source or target leaf page comprises at least one of the following: a reference to a respective predecessor leaf page and a reference to a respective successor leaf page, and wherein the predecessor leaf page, the leaf page, and the successor leaf page are defined by the logical order of the source or target leaf pages respectively, and the references to predecessor and successor leaf pages are associated with respective storage locations.

* * * * *